United States Patent [19]

Heiniö et al.

[11] Patent Number: 5,340,443
[45] Date of Patent: Aug. 23, 1994

[54] DISTILLATION APPARATUS WITH PAIRED MEMBRANE UNITS

[75] Inventors: Tapio M. Heiniö, Uusikaupunki; Mauri Kontu, Kalanti, both of Finland

[73] Assignee: Aquamax Oy, Uusikaupunki, Finland

[21] Appl. No.: 113,501

[22] Filed: Aug. 27, 1993

Related U.S. Application Data

[63] Continuation of Ser. No. 873,331, Apr. 9, 1992, abandoned, which is a continuation of Ser. No. 640,300, Feb. 26, 1991, abandoned.

[30] Foreign Application Priority Data

Aug. 26, 1988 [FI] Finland .................................. 883947
Aug. 17, 1989 [FI] Finland .................................. 893884

[51] Int. Cl.$^5$ .......................... B01D 1/28; B01D 3/10
[52] U.S. Cl. ...................... 202/182; 202/177; 202/205; 202/266; 202/267.1; 159/24.2; 159/28.6; 159/DIG. 15; 159/DIG. 41; 165/166; 203/11; 203/22; 203/23; 203/26; 203/86; 203/DIG. 8; 203/DIG. 22
[58] Field of Search ............ 202/182, 267.1, 236, 202/266, 205, 177, 197; 203/26, 24, 22, 23, 86, 39, 11, 89, 72, DIG. 17, DIG. 22, DIG. 8; 159/13.1, 13.3, 28.6, 24.1, 24.2, DIG. 15, DIG. 41; 165/166, 167

[56] References Cited

U.S. PATENT DOCUMENTS

| | | | |
|---|---|---|---|
| 1,966,938 | 7/1934 | Stone | 203/26 |
| 2,793,988 | 5/1957 | Latham et al. | 203/26 |
| 3,161,574 | 12/1964 | Elam | 203/86 |
| 3,211,219 | 10/1965 | Rosenblad | 165/166 |
| 3,227,630 | 1/1966 | Beckman | 203/86 |
| 3,366,158 | 1/1968 | Rosenblad | 159/13.3 |
| 3,371,709 | 3/1968 | Rosenblad | 159/13.3 |
| 3,616,835 | 11/1971 | Laurenty | 159/13.3 |
| 3,637,465 | 1/1972 | Wilson | 203/26 |
| 3,738,410 | 6/1973 | Ricca et al. | 159/13.3 |
| 4,341,601 | 7/1982 | Hartig | 203/11 |
| 4,424,098 | 1/1984 | Hartig | 159/13.1 |
| 4,671,856 | 6/1987 | Sears | 203/26 |
| 4,734,167 | 3/1988 | Goeldner | 203/26 |

FOREIGN PATENT DOCUMENTS 0034920 9/1981 European Pat. Off. .
2511144 9/1976 Fed. Rep. of Germany .

*Primary Examiner*—Wilbur Bascomb, Jr.
*Attorney, Agent, or Firm*—Bell, Seltzer, Park & Gibson

[57] ABSTRACT

The invention relates to a distillation apparatus including a housing (1) a blower (2), preheat exchangers (7) and (8) and an evaporative condenser (25) comprising pairs (13) of membranes. One pair (13) of membranes at a time can be detached from the evaporative condenser (25) for replacement. The pairs (13) of membranes are preferably made of plastic or similar material and they hang down loosely in the evaporative condenser.

7 Claims, 3 Drawing Sheets

DISTILLATION APPARATUS WITH PAIRED MEMBRANE UNITS

This is a continuation of co-pending application Ser. No. 07/873,331 filed on Apr. 9, 1992, now abandoned, which is a continuation of application Ser. No. 07/640,300 filed on Feb. 26, 1991 (now abandoned).

The invention relates to a distillation apparatus comprising
a housing,
an evaporative condenser with an evaporator part and a condenser part and fitted within the housing,
means for feeding liquid to be distilled into the evaporator part of the evaporative condenser,
means for generating a vacuum in the evaporative condenser, and
a blower for conveying the vapour generated in the evaporator part into the condenser part of the evaporative condenser.

Briefly, the operating principle of a distillation apparatus operating on the vapour compressor principle is as follows: The liquid to be distilled is first heated with distillation and waste water in preheat exchangers, whereafter it is supplied to an evaporator. From the evaporator vapour is sucked by means of a blower (compressor) while the non-evaporated (waste) water flows to the bottom of the evaporator. The pressure and the temperature of the vapour rise after the blower. From the blower the vapour is led to a condenser in which it is condensed and heat is transferred to the water fed to the evaporator so that the water is evaporated. The distillate flows to the bottom of the apparatus under the influence of gravity. The evaporation temperature can be chosen as desired by varying the internal pressure of the apparatus. Temperatures generally used range from 50 to 60° C., whereby a required vacuum is created within the apparatus.

The most usual application of distillation apparatuses of the vapour compressor type has been the production of fresh water from sea water. In prior art apparatuses, the evaporative condensers are of the tube or plate heat exchanger type. The distillation of sea water has been problematic with these apparatuses mainly for two reasons.

First, sea water is highly corrosive under the distillation conditions with resultant severe corrosion problems. Therefore titanium and cupro-nickel, for instance, have been used as evaporator materials. The use of special alloys makes the apparatuses expensive and deteriorates their competitive ability over alternative methods, such as reverse osmosis.

Another problem with prior art distillation apparatuses has been the contamination of the heat transfer surfaces. The properties of different kinds of sea water vary widely in this respect, and the design of the apparatuses has required expertise in water chemistry. Contaminants adhere readily to rigid metal surfaces. As a consequence, it has been necessary to wash and flush the existing apparatuses periodically during the operation period.

The object of he invention is to eliminate the above drawbacks and to provide an apparatus of improved applicability which is easier to maintain.

The apparatus according to the invention is characterized in that the evaporative condenser comprises a number of at least essentially closed pairs of membranes, the spaces between said pairs of membranes forming the evaporator part of the evaporative condenser and the spaces within said pairs of membranes forming the condenser part of the evaporative condenser.

The membranes are preferably made of a plastic film or the like material.

An advantage of the evaporative condenser of the invention over the prior art is its inexpensive structure. As the heat transfer surfaces preferably are made of thin plastic membranes, the price per unit area is only a fraction of that of a surface made of titan. As is known, plastic materials are highly resistant to corrosion, so plastic heat transfer surfaces do not suffer from corrosion.

A disadvantage of plastic is its poor thermal conductivity, which often requires the use of large surface areas. In distillation apparatuses of the vapour compressor type, the pressure difference between the evaporator and the condenser is only about 150 to 300 mm of a water column. For this reason, very thin membranes can be used in the apparatus of the invention. Suitable plastic films are readily available on the market; alternatively metal folios may be contemplated. Each pair of membranes can be detached separately from the evaporative condenser and the replacement can be carried out under operative conditions.

In addition, the apparatus according to the invention is not liable to contamination because of the flexibility of the heat transfer surfaces. Contaminants adhering to the surfaces can be shaken off by pressure variation.

If, as in prior distillation apparatus, the entire blower, or compressor, with accessories is arranged exterior of the housing of the evaporative condenser, the entire compressor unit is to be protected and constructed against the ambient air. This will make the compressor unit very expensive and complex. Particularly the shaft seal is a complicated and, in small apparatuses, an energy-consuming part. Also the construction of the inlet and outlet pipelines of the compressor, with their connectors, will be expensive and laborious to carry out.

A further object of the invention is to eliminate these problems. This object is achieved with a preferred embodiment of the apparatus where the blower, including its drive motor, is installed within the housing of the evaporative condenser.

In this way, the structure of the blower and the entire distillation apparatus is essentially simplified, since no shaft inlets or exterior duct joints are necessary.

The impeller of the compressor is preferably installed directly on the shaft and bearings of the drive motor, whereby no separate shaft-bearing unit is needed for the compressor. In that case, it is also preferred that a seal unit is fitted between the bearings of the drive motor and the impeller of the compressor, said seal unit preventing the drift of vapour to the bearings of the motor.

If one additionally wishes to ensure that a leakage within the compressor will not escape into the distillate, a detached room for the compressor and its accessories should preferably be separated within the housing, wherefrom there is a pressure connection to the condenser part of the evaporative condenser and a fluid connection to the evaporator part of the evaporative condenser.

The invention is more closely explained in the following with reference to the accompanying drawing which by way of example schematically show two embodiments of the distillation apparatus of the invention.

Figure 1:
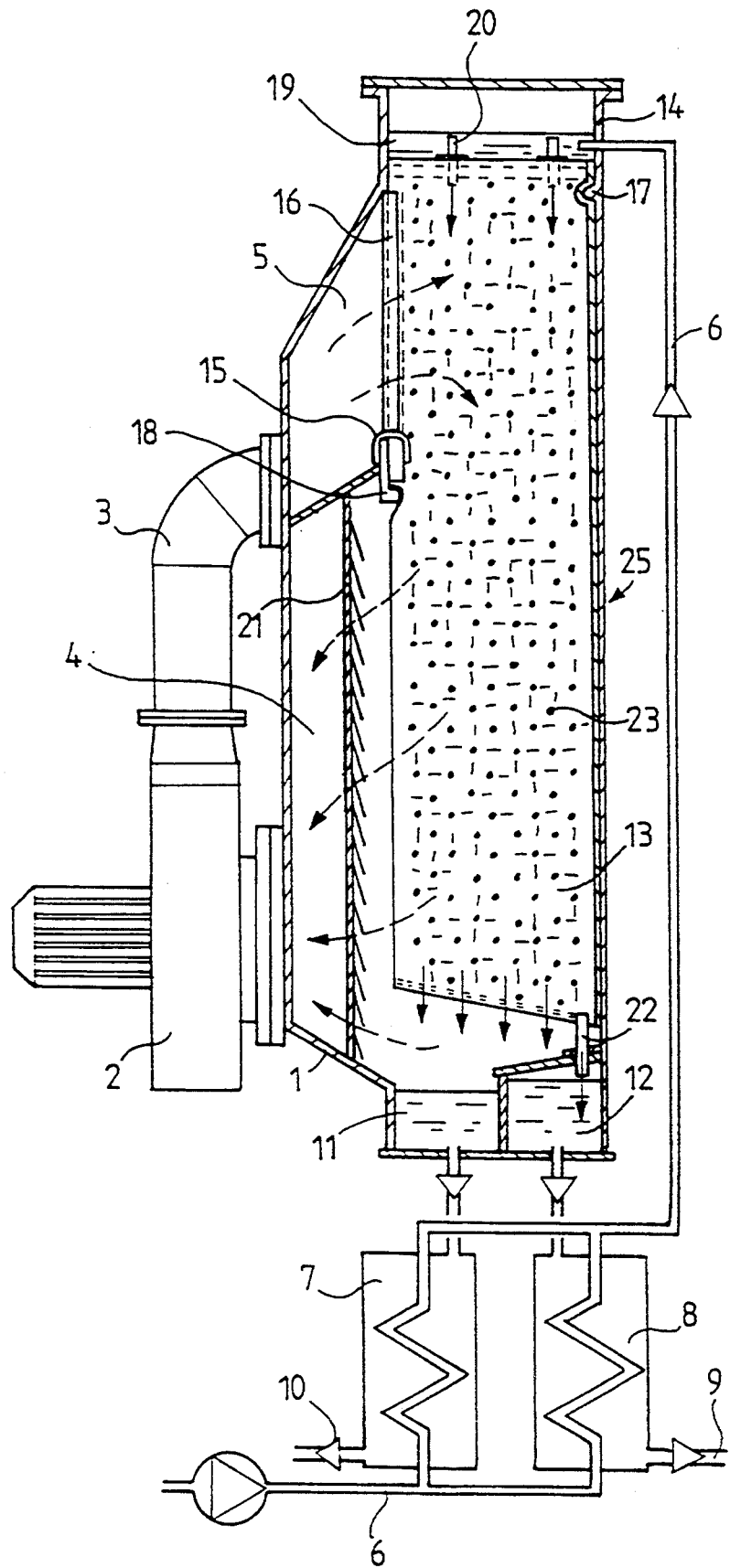
FIG. 1 is a partly cross-sectional side view of a first embodiment of the invention.
Figure 2:
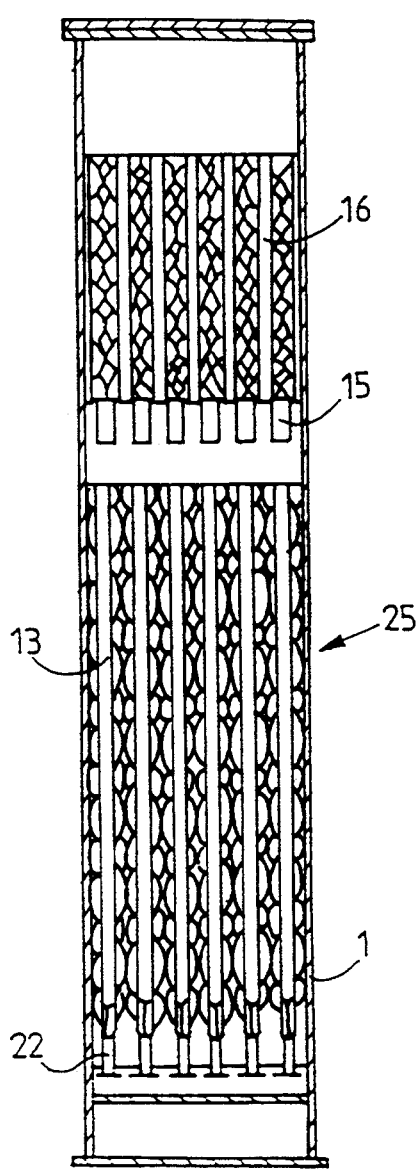
FIG. 2 is a front view of the evaporative condenser.
Figure 3:
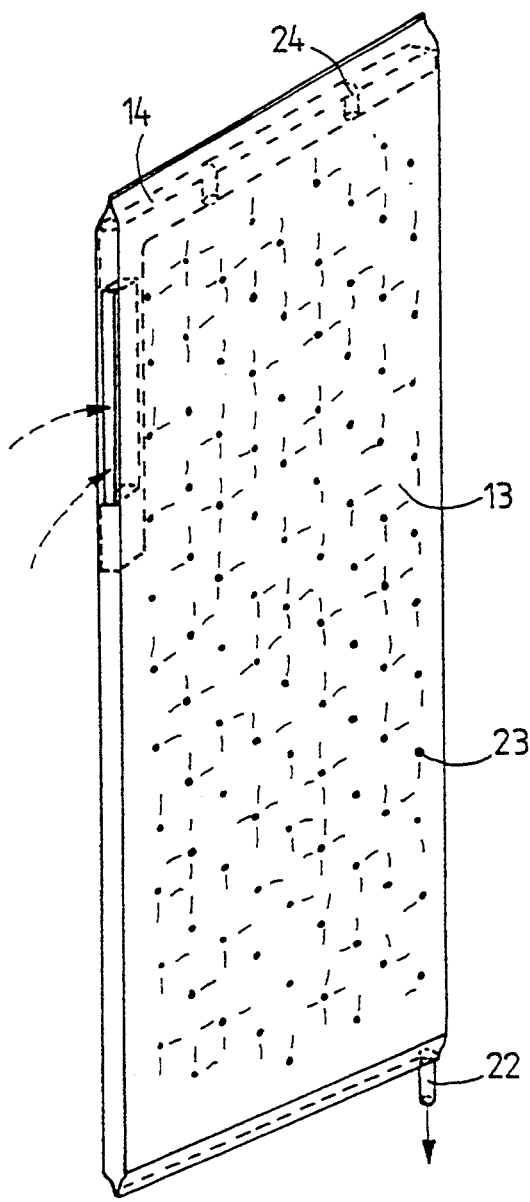
FIG. 3 shows a pair of membranes.
Figure 4:
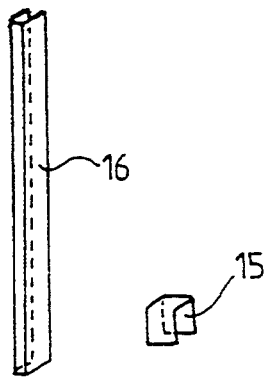
FIG. 4 shows support and clamping parts for vapour supply openings.

In FIG. 1, the reference numeral 1 designates a housing of the distillation apparatus. The reference numeral 2 designates a blower. The reference numeral 3 designates a vapour conduit and the numerals 4 and 5 suction and feed chambers for vapour. A supply line for water to be distilled is designated 6. 7 and 8 designate preheat exchangers. Discharge lines for waste water and distillate are designated 9 and 10, respectively. Drainage basins for the distillate and waste water are designated 12 and 11. A pair of membranes, or films, in an evaporative condenser 25 is indicated by the numeral 13, and spot welds interconnecting the membrane are indicated by 23. A support for the pair of membranes is designated 14.

Clamps at the lower edge of the vapour supply opening are designated 15 and vertical clamps 16. Supports of the pair of membranes are designated 17 and 18. A distributing basin for water to be distilled is designated 19 and distributing tubes 20. The numeral 21 designates a drop separator. Distillate is discharged from between the pair of films through a tube 22.

The distillation apparatus of FIG. 1 operates in the following way: Water to be distilled is passed through the supply line 6 via the preheaters 7 and 8 to the distributing basin 19, from where it flows through the tubes 20 into passages defined between the pairs of membranes, wherein it is evaporated. Unevaporated water flows into the basin 11. The blower 2 blows the generated vapour from the suction chamber 4 via the feed chamber 5 into the passages inside each closed pair of membranes, where the vapour is condensed and flows through the tubes 22 into the basin 12. Heat from the distillate and waste water is recycled through the heat exchangers 8 and 7 to the supply water, which improves remarkably the efficiency of the apparatus.

The pairs of membranes of the evaporative condenser are preferably made of a closed hose-like of plastic film, the upper and lower edge of which are welded together and the upper edge is provided with a support 14, the upper portion of which is provided with grooves 24 for the tubes 20. In order that the passages defined between the membranes of each pair 13 would be of desired size, the membranes are welded together by means of spot welds 23. The lower edge of the pair of membranes is made slanting so that the distillate flows into the tube 22. The supports 14 are provided with openings at their sides for the supply of vapour. The pairs 13 of membranes are bonded together after the film positioned at the vapour supply opening has been cut open. The bonding takes place by the vertical clamps 16, which also serve as seals, preventing the vapour from entering the evaporator.

The pairs of membranes are secured to the housing 1 by means of the clamps 15. The support 14 rests on supports 17 and 18 and the lower portion of the membrane pair hangs down loosely. Spacing between the evaporator and condenser passages can be adjusted as desired by varying the number of the spot welds 23 and the thickness of the supports 14. In the passages of the evaporator the membranes may make contact with each other at their most expanded points, which strengthens the structure. An expandable and constricting passage is highly advantageous for the heat transfer.

If some of the membranes is torn in use, the pair of membranes can be replaced by detaching the clamps 15 and 16 and by loosening the whole membrane pack, whereafter the pair of membranes can be replaced without any special tools.

The embodiment illustrated in FIG. 5 comprises a housing indicated with the reference numeral 31, within which is fitted an evaporative condenser 32 of the same general structure as earlier described in connection with FIGS. 1 to 4, preheat exchangers 33, 33a and 33b which start conveying and heating the liquid to be distilled, indicated by arrow 50, towards the evaporative condenser 32; a feed apparatus 34 connected to the preheat exchangers for feeding the liquid to be distilled into the evaporated part of the evaporative condenser 32; a vacuum pump 37 for creating a vacuum in the evaporative condenser 32 and at the same time producing a subatmospheric pressure within the housing 31; a compressor 35 connected with the evaporative condenser 32 and installed fully within the housing 1, a drive motor 36 for the compressor, a compressor unit including a duct system assembly and other possible required accessories for raising the pressure and respectively the temperature of the vapour generated in the evaporator part and thereby conveying pressurized and heated vapour into the condenser part of the evaporative condenser 32; a distillate pump 38 for removal of the distillate generated in the condenser; and a waste pump 39 for removal of unevaporated liquid, i.e. waste. The apparatus further comprises an air exhauster which, however, has not been separately shown in the drawing, and a droplet separator denoted by the reference numeral 41 between the evaporative condenser 32 and the compressor 35. The impeller 35a of the compressor 35 is installed directly on the shaft and bearings of the drive motor 36, and a seal unit 40 is fitted between said bearings and said impeller 35a. A detached space 42 for the compressor 35 and the drive motor as well as other pertinent accessories can also be separately mounted within the housing 31.

Reference numeral 43 indicates an outlet line for distillate from the evaporative condenser 32, 44 indicates a discharge line for the distillate. 45 and 46 indicate corresponding outlet and discharge lines for waste, 47 indicates a pump for recirculating a part of the waste, up to 90%. 48 and 49 indicate a cooling circuit for the motor 36. The cooling liquid (distillate) is driven by the pump 38, whereat the heat exchanger 33 from a flow resistance to ensure a sufficient flow of liquid through the line 49 to the motor 36. Vapour is also condensed in the heat exchanger 33b and the resulting distillate flows through line 51 joining the distillate of line 43.

The pumps 38, 39 and 47 may be arranged within the housing 31.

Figure 5:
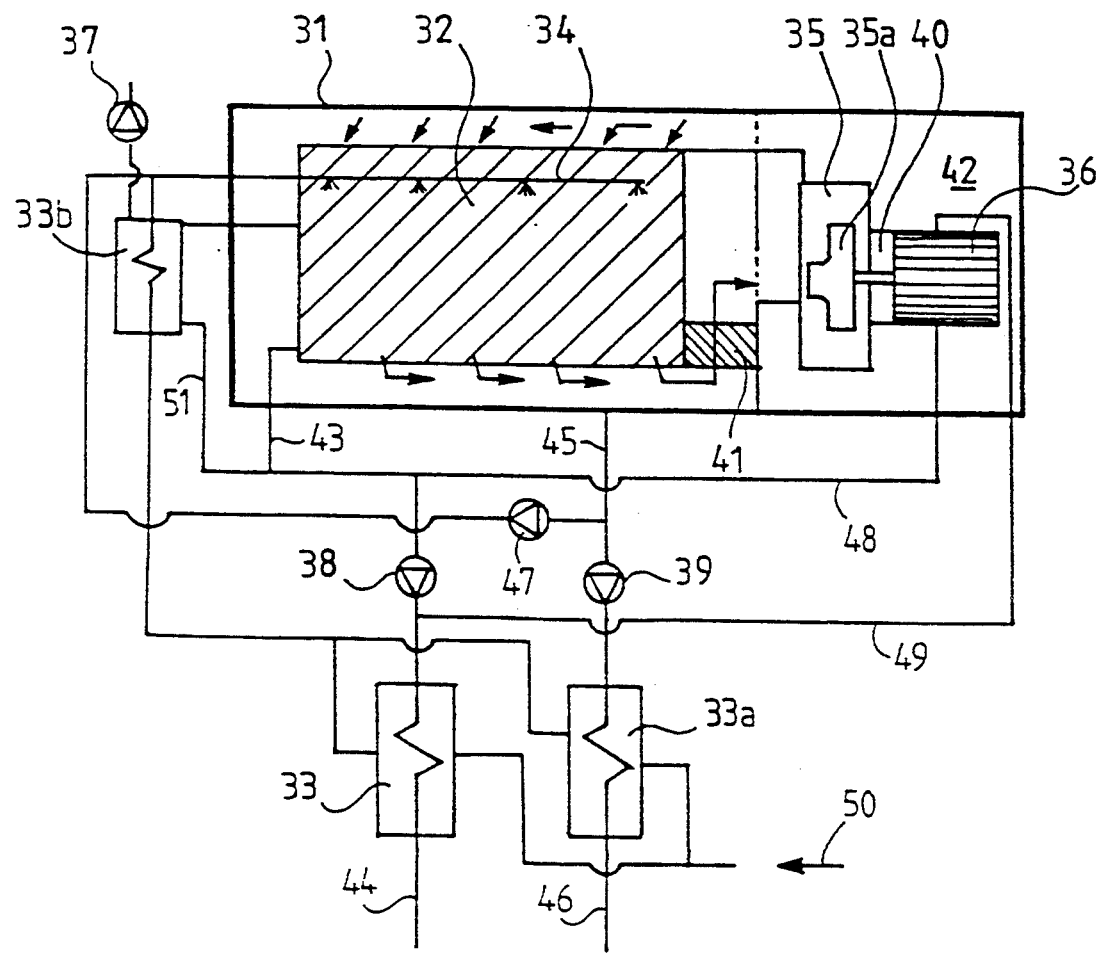
FIG. 5 is a schematical view of a second, preferred embodiment of the invention.

The operating principle of the distillation apparatus of FIG. 5 is the following:

The liquid to be distilled, e.g. sea water, is heated in the preheat exchangers 33, 33a and 33b and the air exhauster to boiling temperature (e.g. 50° C.). The liquid passes through the feed apparatus 34 into the evaporator part of the evaporative condenser 32 and starts boiling, since a vacuum has been created in the system by means of the vacuum pump 37. The generated vapour is drawn into the compressor 35 wherein the pressure of the generated vapour is increased e.g. by 20%, whereby simultaneously the boiling temperature of the vapour will raise correspondingly, since the vapour is saturated.

After the compressor 35, the hotter vapour is conveyed into the condenser part of the evaporative condenser 32 wherein the vapour is condensed into distillate. Simultaneously the released condensation heat energy is carried over to the liquid circulating on the evaporator side, thus evaporating new liquid.

Thus the process is continued, and the only external energy which is needed is the energy required by the drive motor 36 of the compressor 35 (electrical energy). The produced distillate and unevaporated liquid are pumped with pumps 38 and 39 through discharge lines 44 and 46 out of the apparatus.

The invention is not restricted to the embodiments shown in the drawing but may vary within the scope of the subsequent claims. It is also to be understood that the apparatus according to the invention has a great number of other applications as well.

We claim:

1. A distillation apparatus comprising:

a housing;

a plurality of membrane units placed within said housing, each unit being defined by a pair of plastic membranes seamed together from their edges and having a support for hanging of the unit and an opening communicating with the inside of the unit, and each unit having an expandable structure with the pair of membranes joined together by a plurality of spot welds;

means for clamping each of said membrane units together from said support to form a pack of membrane units, wherein the spaces between the adjacent units form an evaporator part of the apparatus and the spaces inside the units form a condenser part of the apparatus, said units being spaced so that on expansion the membranes of adjacent units make contact with each other at a number of points to form evaporator passages therebetween, and said clamping means being detachable to enable individual replacement of said units;

means for generating a vacuum within said housing;

means for feeding liquid to be distilled into said evaporator part;

a blower for conveying vapor generated in the evaporator part via said openings into said condenser part;

means for discharging residual liquid from the evaporator part; and means for discharging distillate from the condenser part.

2. The apparatus according to claim 1 further comprising a supply basis for liquid to be distilled whereby the bottom of said supply basis is formed by said supports for said pairs of membranes, and further said supports comprise grooves for liquid distribution tubes.

3. An apparatus according to claim 2, wherein said supports are positioned within respective pairs of membranes and the sides of said supports are provided with openings for the feed of vapour and the pairs of said membranes are fastened to each other by means of clamps at the edges of said vapour openings.

4. An apparatus according to claim 1, characterized in that said pairs of membranes hang down loosely on supports and provided at the upper portion of the membrane unit, and that the lower portion of the pairs of membranes is slanted and provided with a discharge tube.

5. An apparatus according to claim 1 further comprising, said blower, including a drive motor installed within said housing.

6. An apparatus according to claim 5, further comprising, a seal unit fitted between said drive motor and said blower whereby the drift of vapour to the motor is prevented.

7. An apparatus according to claim 5, further comprising, providing a space separated within said housing for said blower from which space there is a pressure connection to a condenser unit of the membrane unit and a fluid connection to an evaporator part of the apparatus.

* * * * *

UNITED STATES PATENT AND TRADEMARK OFFICE
CERTIFICATE OF CORRECTION

PATENT NO. : 5,340,443
DATED : August 23, 1994
INVENTOR(S) : Tapio M. Heinio and Mauri Kontu It is certified that error appears in the above-indentified patent and that said Letters Patent is hereby corrected as shown below:

On the title page, Under Related Application Data, after Feb. 26, 1991, abandoned, insert filed as PCT —/FI89/00157—.

Column 6, lines 12 and 13, "basis" should be —basin—.

Signed and Sealed this

Sixth Day of December, 1994

Attest:

BRUCE LEHMAN

Attesting Officer  Commissioner of Patents and Trademarks